United States Patent
Cicchitti

(10) Patent No.: US 11,919,725 B2
(45) Date of Patent: Mar. 5, 2024

(54) PARCEL HANDLING AND TRACKING SYSTEM AND A METHOD OF SCANNING IDENTIFYING FEATURES ON PARCELS

(71) Applicant: Fameccanica.Data S.p.A., San Giovanni Teatino (IT)

(72) Inventor: Anselmo Cicchitti, San Giovanni Teatino (IT)

(73) Assignee: Fameccanica.Data S.p.A. (IT)

( * ) Notice: Subject to any disclaimer, the term of this patent is extended or adjusted under 35 U.S.C. 154(b) by 0 days.

(21) Appl. No.: 17/981,932

(22) Filed: Nov. 7, 2022

(65) Prior Publication Data
US 2023/0145197 A1   May 11, 2023

(30) Foreign Application Priority Data
Nov. 9, 2021   (EP) .................... 21207320

(51) Int. Cl.
*B65G 47/49*  (2006.01)
*B65G 45/10*  (2006.01)
*B65G 47/90*  (2006.01)

(52) U.S. Cl.
CPC .......... *B65G 47/493* (2013.01); *B65G 45/10* (2013.01); *B65G 47/90* (2013.01); *B65G 2201/0285* (2013.01); *B65G 2203/044* (2013.01)

(58) Field of Classification Search
CPC ...... B65G 47/493; B65G 47/49; B65G 47/90; B65G 2201/0285; B65G 2203/044; B65G 47/48
See application file for complete search history.

(56) References Cited

U.S. PATENT DOCUMENTS

| | | | |
|---|---|---|---|
| 4,064,390 A | 12/1977 | Hildebrand et al. | |
| 10,593,162 B2* | 3/2020 | Nemati | G07G 1/0018 |
| 2019/0325712 A1 | 10/2019 | Nemati et al. | |
| 2023/0028431 A1* | 1/2023 | Kothari | B25J 15/0019 |

FOREIGN PATENT DOCUMENTS

| EP | 2246276 A1 | 11/2010 |
|---|---|---|
| JP | 2006160416 A | 6/2006 |

OTHER PUBLICATIONS

European Search Report dated Mar. 25, 2022. 7 pages.

\* cited by examiner

*Primary Examiner* — Michael McCullough
*Assistant Examiner* — Jessica L Burkman
(74) *Attorney, Agent, or Firm* — RMCK Law Group PLC

(57) ABSTRACT

A parcel handling and tracking system allows an all-around scanning of identifying features thanks to a scanning window, where the parcels are configured to sit at the scanning window on a resting surface of the parcel itself. The scanning window is light permeable to allow reading of the identifying features at the resting surface, possibly together with other identifying features at surfaces of the parcel other than the resting surface.

15 Claims, 5 Drawing Sheets

PARCEL HANDLING AND TRACKING SYSTEM AND A METHOD OF SCANNING IDENTIFYING FEATURES ON PARCELS

CROSS-REFERENCE TO RELATED APPLICATION

This application claims priority to European Patent Application No. 21207320.9 filed Nov. 9, 2021. The disclosure of the above application is incorporated herein by reference in its entirety.

FIELD OF THE INVENTION

The present invention relates to parcel handling and tracking.

PRIOR ART

Parcel handling and tracking relies entirely on accurate reading of identifying features provided onto the parcels, such as bar codes, QR codes, etc. To achieve optimal tracking of the parcels, identifying features are printed or attached or otherwise embedded at each side, surface or face of the parcel, and the parcel is processed through a scanning tunnel that features multiple reading devices each configured for reading 1D or 2D identifying features at a specific side, surface or face of the parcel (sometimes even more than one reading device One of the most common technical problems associated to parcel handling and tracking is the reading of the identifying feature located at the side, face or surface of the parcel the parcel rests on during handling. For instance, in case of a six-face, cubic or prismatic parcel, the "base" of the parcel—i.e. the face that contacts a handling conveyor or simply a bearing surface—is simply out of reach for any reader as it is covered by the surface it rests on.

FIGS. 1 to 4 are representative of the above prior art, wherein reference TS designate a parcel handling and tracking system according to prior art designs. The parcel handling and tracking system TS includes a scanning tunnel or gate SG arranged gantry-wise over a first (or upstream) conveyor CV1, and a second (or downstream) conveyor CV2, the conveyor CV1 being spaced by a gap G from the conveyor CV1, the gap being defined along a conveyor direction VX, i.e. a direction at which the conveyors CV1 and CV2 set items conveyed thereby into motion.

The scanning tunnel or gate SG (FIGS. 1 and 2) is preferably configured so to include a plurality of cameras C1, C2, C3, C4, preferably 2D scanning devices such as matrix data scanners or 2D cameras, having a field of view sufficient to frame all of the side faces and the top face of a parcel P and read one or more identifying features ID1, ID2, ID3 on corresponding faces of the parcel P. Generally, at least one camera is provided for reading identifying feature at each face, whereby the five exposed faces of the parcel P each are monitored by at least one camera. Other arrangements may feature a redundancy of cameras at each face, whereby an identifying feature at a face is read by more than one (2D) scanning device, or may feature a split scanning arrangement wherein each 2D scanning device is configured to image at least one face/surface of the parcel P.

2D scanning devices used for identifying features scanning are usually high resolution cameras (typically 5 Megapixels or more) and with a wide range of focal lengths (200 mm-1500 mm), which allows for a very flexible positioning of the cameras around the scanning tunnel or gate SG.

As anticipated, a technical problem exists when a parcel P is provided with multiple identifying features all over the faces thereof, including the face it rests on when on the conveyors CV1, CV2, or when the parcel is provided with a single identifying feature which happens to be located on the face the parcel P rests on, i.e the hidden face thereof (this being either the result of a handling that does not occur based on parcel orientation, or by features of the parcel, for instance). The identifying feature is referenced as ID4 in FIGS. 1 through 4. And is hidden from the field of view of all of the cameras C1-C4 (or whatever combination of cameras on the scanning tunnel or gate SG).

Prior art solution to this technical problem are all dependent on the gap G. In other words, the gap G is used to create a scanning window for identifying features on the hidden face of the parcel P as it actually creates a gap that temporarily exposes the identifying feature(s) ID4 on the hidden face itself.

Unlike the scanning of identifying features on the visible faces, scanning through the gap D restricts the choice of scanning/reading devices to linear scan cameras LSC, FIGS. 1, 3. Such cameras are 1D cameras controlled on the basis of an encoder/encoders that reads the angular position of rolling elements of the conveyor CV1/both conveyors CV1 and CV2. Synchronization through the encoder(s) is required in that the linear scan cameras acquires the image line-wise and reconstructs an image by assembling subsequently framed image lines scanned through the extension of the target surface.

Linear scan cameras LSC are not expressly designed for scanning and tracking purposes, but on the other hand the limited space available at the gap G makes it impossible to fit 2D scanning devices as they would simply be unable to scan the entire identifying feature. The gap G may only be practiced with a limited extension, as wide gaps G render the tracking system TS prone to jamming or failures, as the parcel would easily get jammed or trapped into the gap G, or even fall of the conveyors CV1, CV2 if small or thin enough to enter the gap G. Typical dimensions of the gap G are simply not enough to expose a whole identifying feature for reading by a 2D scanning device. Prior art solution therefore all envisage the use of a linear scan camera LSC through the gap G, and after the scanning tunnel or gate SG, which reads the identifying feature ID4 on the hidden face of the parcel P prior to release of the parcel P on a third (takeaway) conveyor CV3, FIG. 4.

The problem is that unlike 2D scanning devices, linear scan cameras LSC have a very low resolution, a very limited—usually fixed—focal length, which is also much shorter than the focal lengths of the 2D scanning devices C1-C4, hence requiring closer positioning of the linear scan camera LSC to the identifying feature to be scanned in the gap G (i.e. closer positioning of the linear scan camera to the tracking system TS as a whole), and setting up further operational constraints and difficulties.

Notwithstanding this, the use of linear scan cameras still suffers from multiple technical problems, including:
  i) very inaccurate reading of the identifying features in case of irregularly shaped parcels (e.g. air-filled bags with bulged walls);
  ii) very inaccurate reading of the identifying features when the parcel bumps at the gap G, i.e. when the parcel P meets the second conveyor CV2 at an angle that causes it to hit and bounce off the surface of the conveyor CV2;
  iii) the data processing unit must operate based on two rather different data sets, one from the 2D scanning devices or cameras (image data), the other from linear scan cameras (scanned image lines reconstructed into an image), which moreover depend on encoder operation.

OBJECT OF THE INVENTION

The object of the present invention is to overcome the above mentioned technical problems. Specifically, it is an object of the invention that of allowing a correct and reliable reading of identifying features on hidden faces of parcels P without compromising on camera performances and/or tracking system performances.

SUMMARY OF THE INVENTION

The object of the invention is achieved by a tracking system and a method having the features of the claims that follow, which form an integral part of the technical disclosure provided herein in relation to the invention.

BRIEF DESCRIPTION OF THE FIGURES

Further features and advantages of the invention will become apparent from the following description with reference to the annexed figures, given purely by way of non-limiting example, wherein.

DETAILED DESCRIPTION

Figure 1:
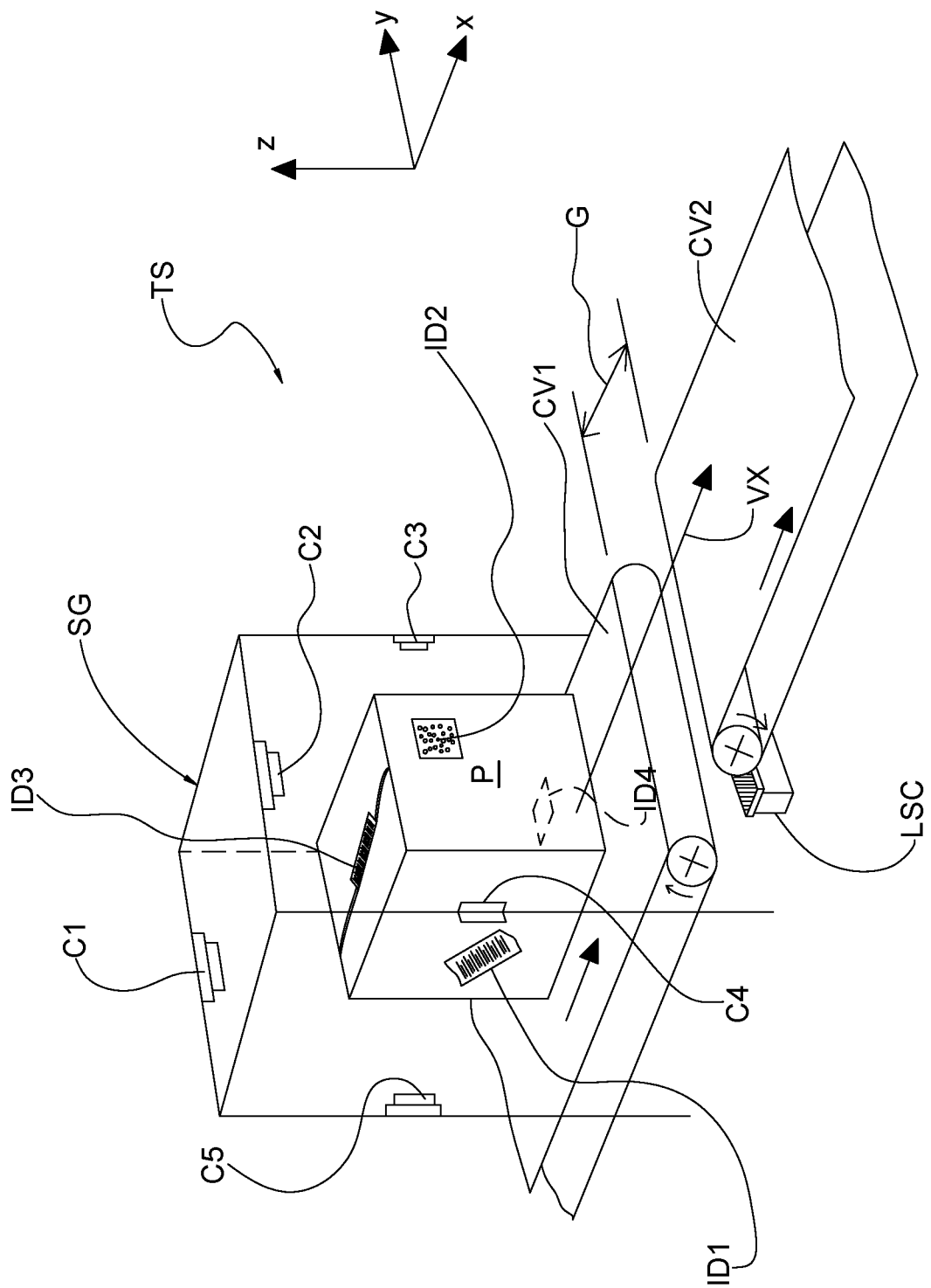
FIG. 1 is a schematic perspective view of a prior art tracking and handling system.
Figure 3:
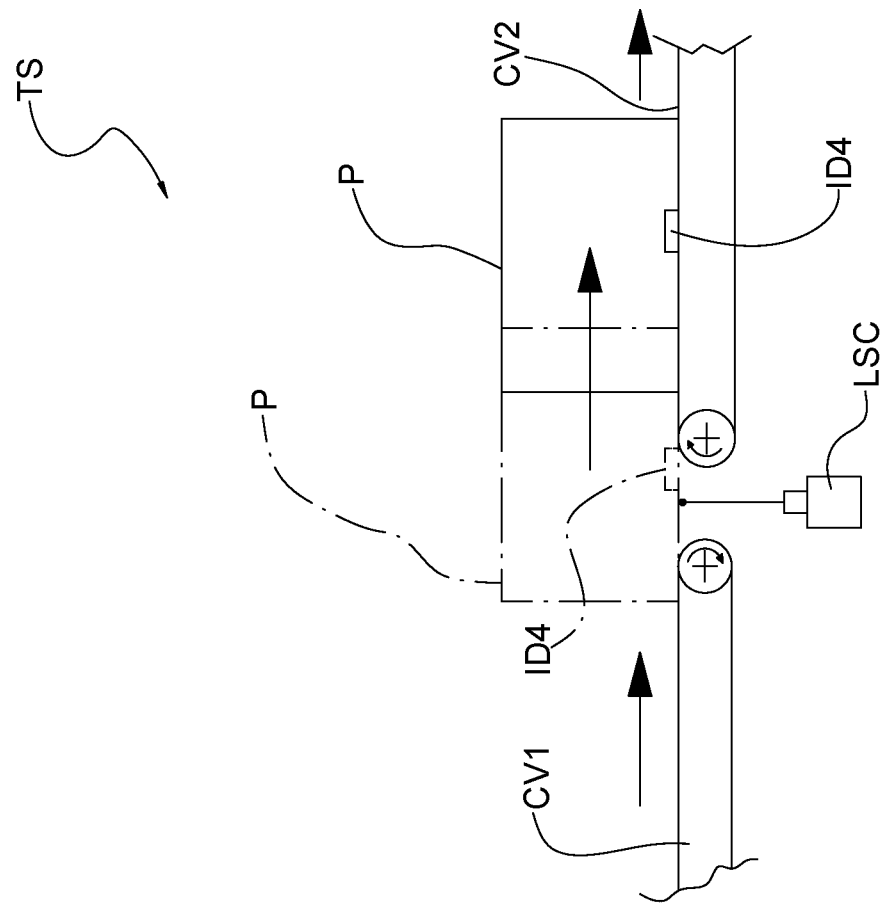
FIGS. 2, 3 and 4 are schematic views of components and/or an operational sequence of the prior art tracking and handling system of FIG. 1.
Figure 2:
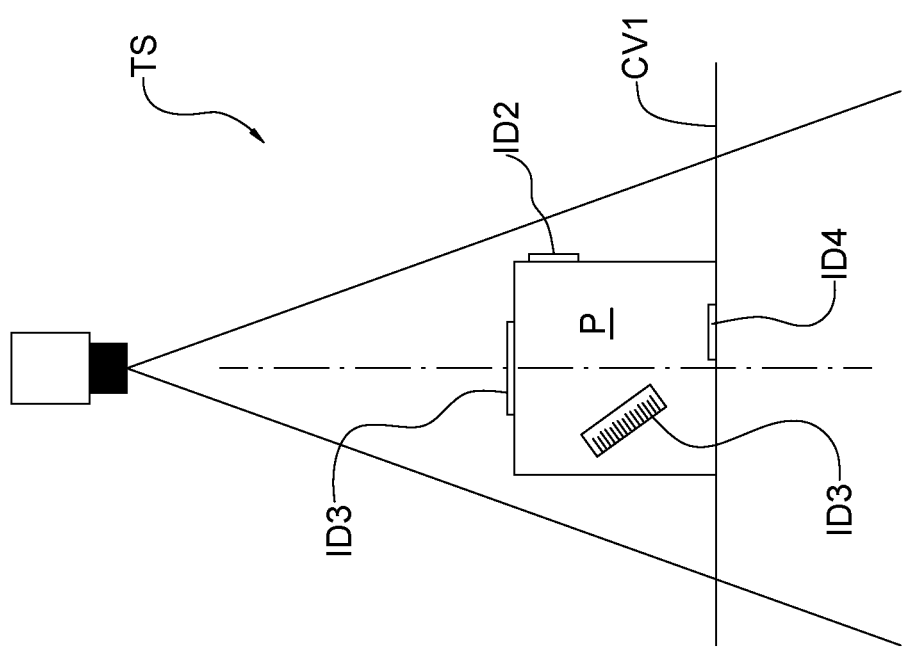
Figure 5:
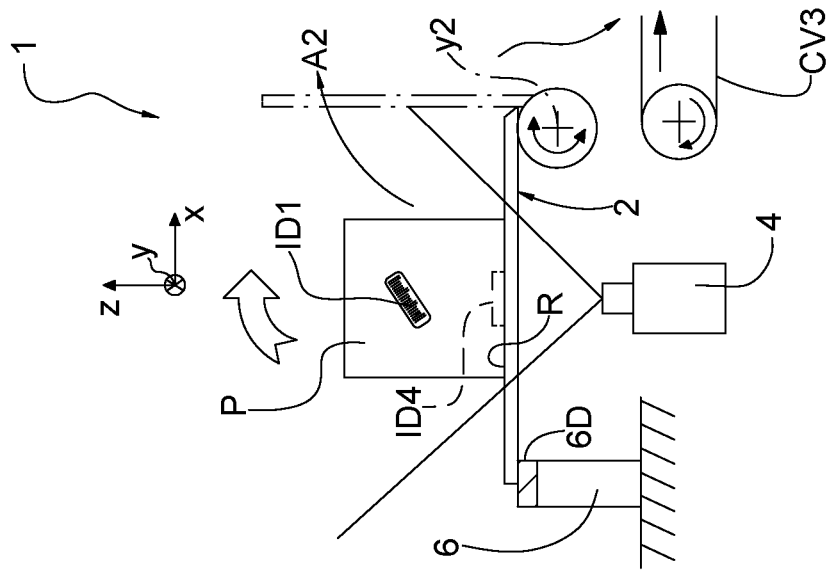
FIG. 5 is a schematic representation of a parcel handling and tracking system according to the invention.
Figure 4:
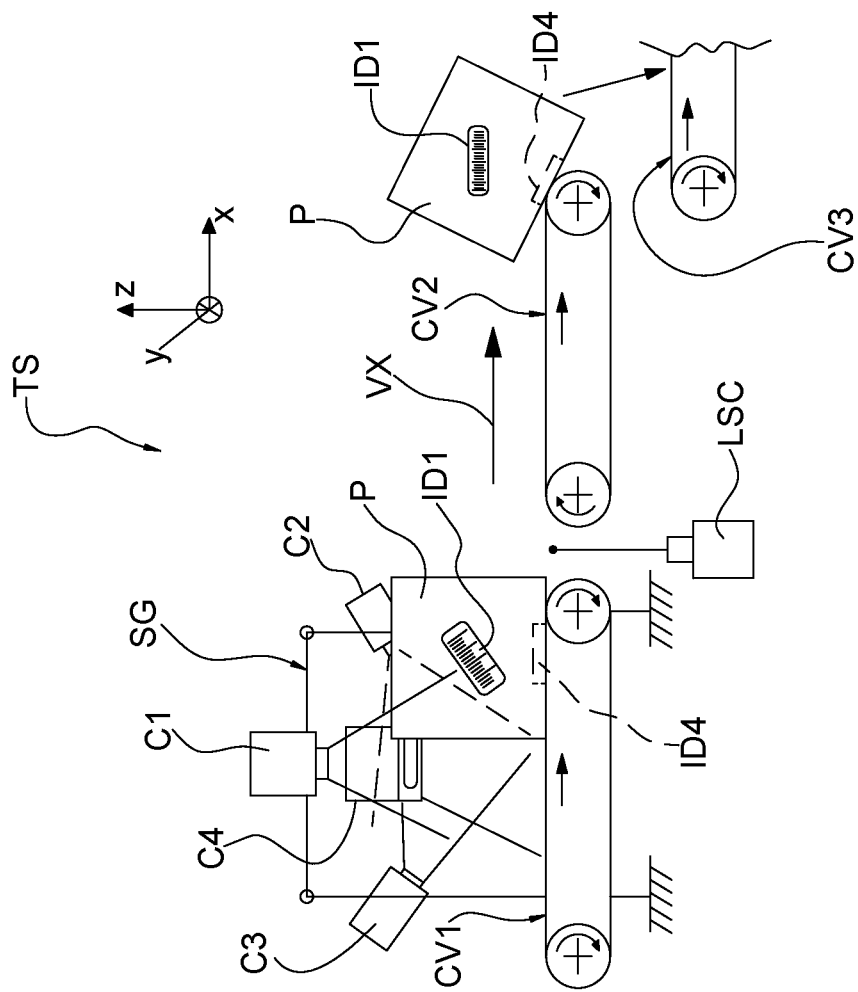

Reference number 1 in FIG. 5 designates as a whole a parcel handling and tracking system according to the invention. Some of the references are identical to those used in the foregoing description (e.g. those of the parcel P) and are to be understood as having the same meaning.

The parcel handling and tracking system 1 (hereinafter, for brevity, "system 1") is configured for reading identifying features on parcels P moving through the handling and tracking system 1.

The system 1 comprises a scanning window 2 movable from a reading position depicted in solid line in FIG. 5 to a transfer position depicted in phantom line in FIG. 5, and configured to support a parcel P at a resting surface R of the parcel when in the reading position. Although the figures only depict a box-shaped parcel, a resting surface can nevertheless be identified in each and every parcel possibly coming to rest at the scanning window 2, including, for instance, envelopes or bags (whether gas filled or not) or the likes. The resting surface R, as described in the foregoing, is a surface at which the parcel P rests on or abuts the scanning window 2 when standing on the scanning window itself.

The system 1 further comprises a first scanning device 4 positioned at the scanning window 2 on an opposite side of the parcel P with respect to the scanning window 2 when the scanning window 2 is in the reading position. The scanning device 4 is configured to scan identifying features on the parcel P, and specifically identifying features on the resting surface R of the parcel P.

The scanning window 2 is light permeable to allow scanning therethrough of an identifying feature ID4 at the resting surface R of the parcel P by the scanning device 4 when the scanning window 2 is in the reading position. The scanning device 4 preferably comprises a 2D scanning device, such as a 2D camera or a data matrix scanner. This is an advantage of the invention over prior art systems in that it is no longer necessary to resort to linear scan cameras to scan identifying features on the hidden resting surface of a parcel. According to the invention, the hidden resting surface R is made accessible for scanning by the reading window 2, which is preferably made of shatterproof glass.

The scanning window 2 is movable to the transfer position to move the parcel off the scanning window and to a takeaway facility, for instance to an output conveyor CV3.

Figure 6:
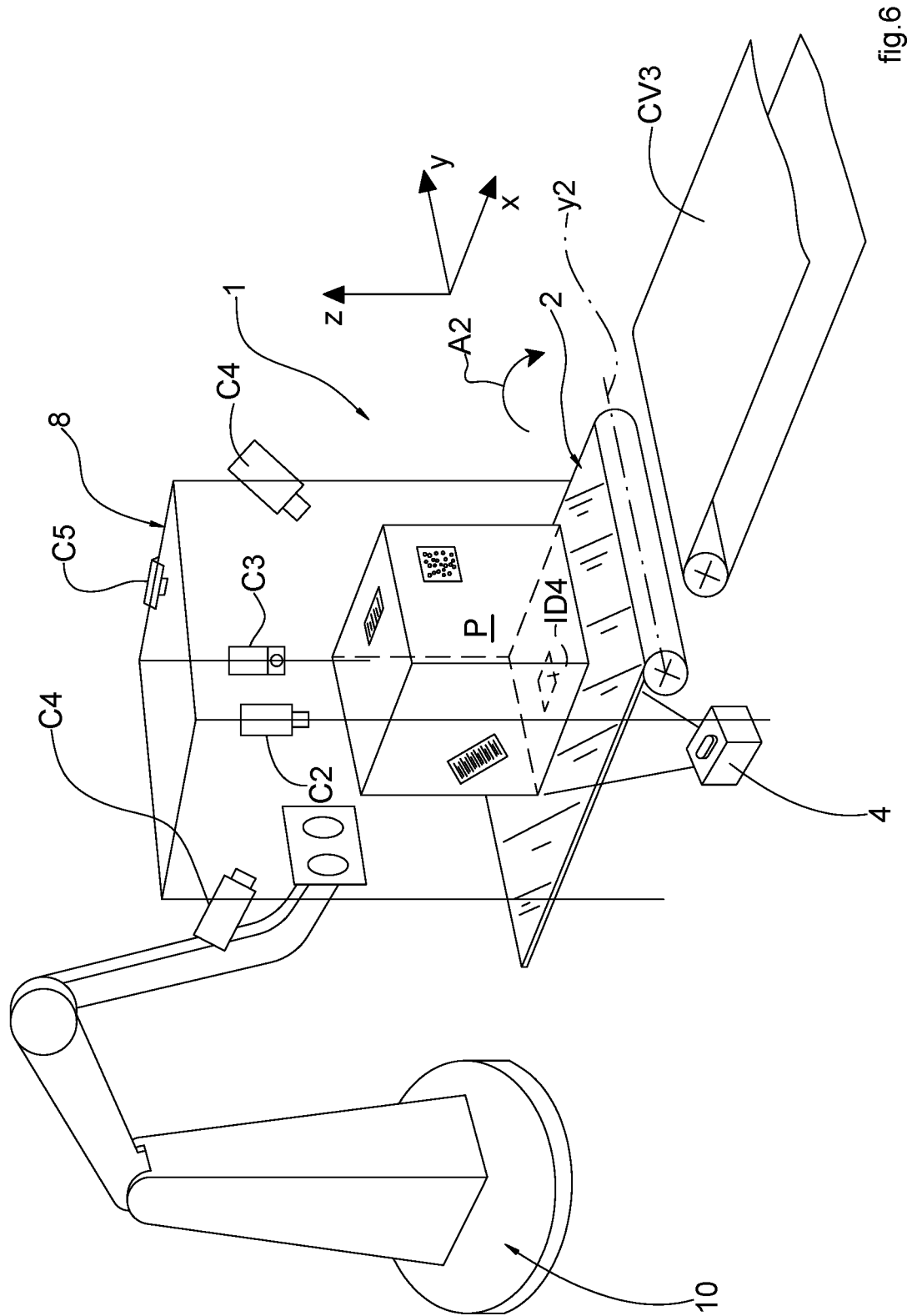
FIG. 6 is a schematic perspective view of an extended configuration of the parcel handling and tracking system of the invention.

As shown in FIGS. 5 and 6, in the reading position the scanning window 2 lies at a horizontal direction (or, in other terms, it is parallel or substantially parallel to a XY plane) so as to support the parcel P thereon, and in the transfer position the scanning window 2 lies at an angle to the horizontal direction to encourage the parcel P off the scanning window. Preferably, said angle is comprised between 30° and 110°, and more preferably—as shown in FIG. 5—it is a right angle, whereby transition from the scanning position to the transfer position essentially corresponds to a 90-degree flip.

In preferred embodiments, transition from the reading position to the transfer position is achieved by arranging the scanning window so as to be rotatable around a first axis Y2 from the reading position to the transfer position (and back). Rotation A2 is representative of the excursion experienced when transitioning from the scanning position to the transfer position. In such embodiments, the system 1 is preferably provided with a support member or post 6 having one or more damping elements to prevent the scanning window from bouncing up and down when rotated back to the scanning position, wherein the scanning window actually rests onto the supporting member or post 6. In preferred embodiments, the damping element comprises a damping tip or top 6D (depending on the shape of the support post or member 6).

In preferred embodiments, the axis Y2 is located at or is parallel to an edge of the scanning window 2, which is accordingly made quadrangular (square or rectangular) in shape. The axis Y2 is located outside a perimeter of the scanning window, as shown in FIG. 5, to maximise the light permeable area on the scanning window 2 that can be used for scanning the identifying feature ID4, which would otherwise be reduced by the footprint of the rotary equipment that operates the scanning window in rotation around the axis Y2.

Figure 7A:
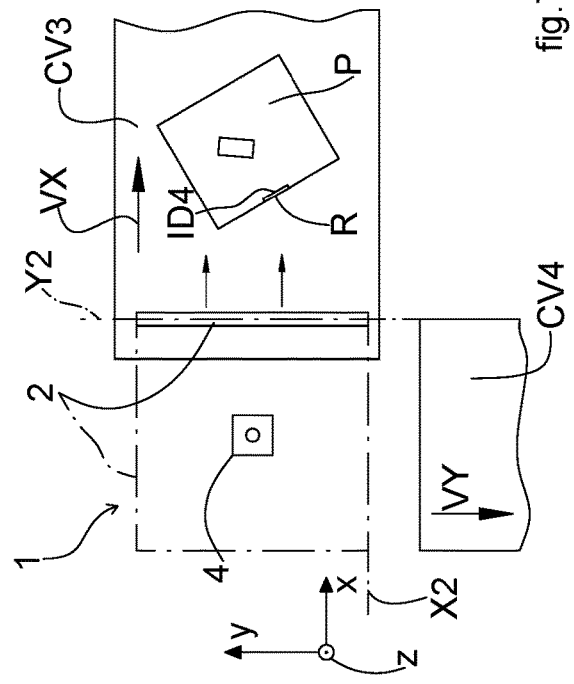
FIGS. 7, 7A, and 7B are schematic representations of an advantageous aspect of the invention.
Figure 7B:
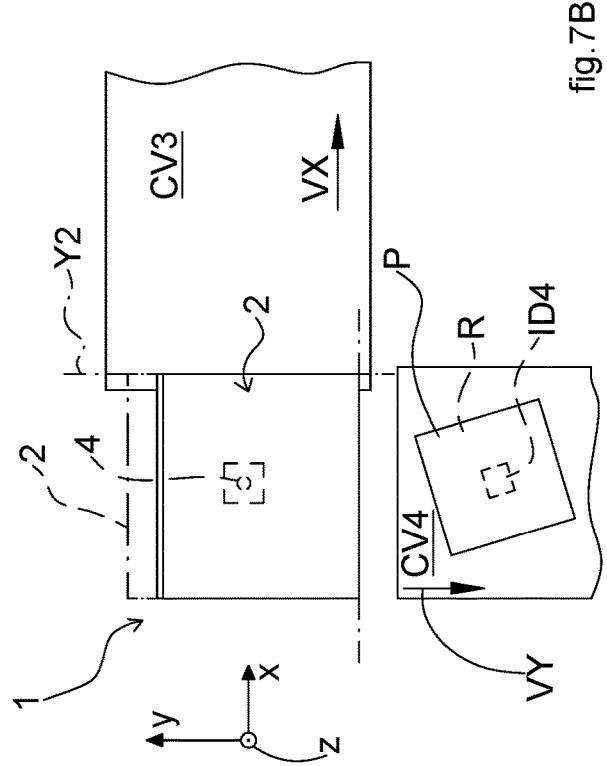
Figure 7:
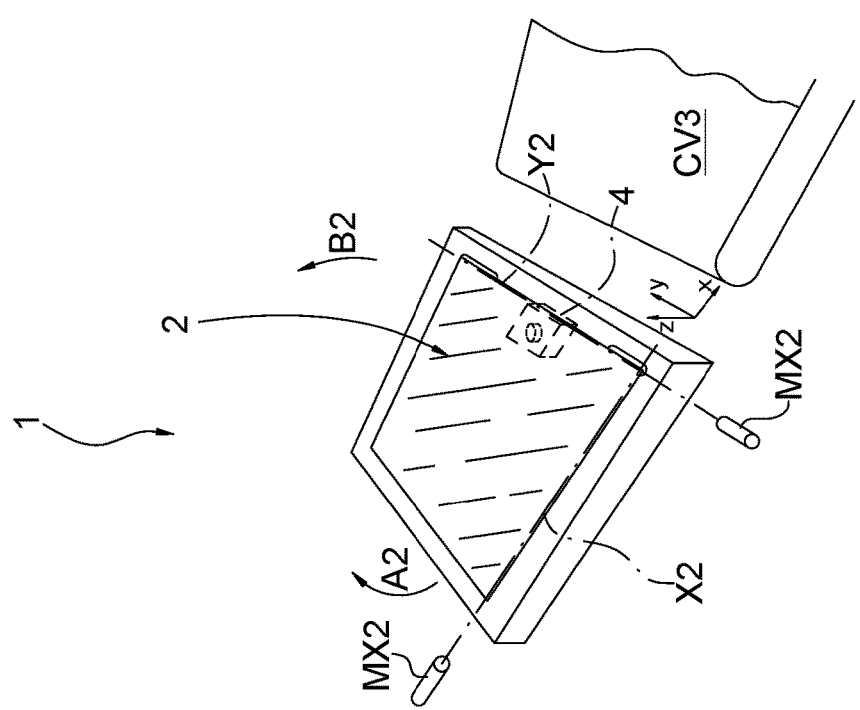

According to an advantageous aspect of the invention, with reference to FIG. 7, the scanning window 2 may feature an additional operating position, namely a rejection position (rotation B2), which is achieved by providing the scanning window 2 with an additional motion away from the scanning position, for instance a rotation around an additional axis X2 orthogonal to the axis Y2. This dual rotation capability may be achieved, for example, through a mechanism the likes of those currently used for tilt-and-turn windows. The "turn" function (rotation A2), with higher excursion, is associated to the main motion of the scanning window 2, i.e. the motion from the scanning position (FIG. 5, solid line) to the transfer position (FIGS. 5, phantom line, and 7A), while the "tilt"

function (rotation B2), which has generally a more limited excursion, is associated to the motion from the scanning position (FIG. 5, solid line) to the rejection position (FIG. 7B), whereby parcel P rejected due to scanning anomalies or irregularities may be rejected by encouraging them off the scanning window 2, and on to a rejection path (e.g. a rejection conveyor CV4 with a conveyor direction VY parallel to the Y axis) that is other than the transfer path to takeaway facilities which is negotiated by the parcels P only when the scanning window is flipped to the transfer position. Separate actuation is provided for each of the motions (scanning-to-transfer, axis Y2, and scanning-to-rejection, axis X2), for instance a first actuator unit MY2 for the scanning-to-transfer operation of the window 2, and a second actuator unit MY2 for the scanning-to-rejection operation of the window 2, each actuator unit being controlled based on the output from the scanning device 4 and the scanning devices onboard the scanning gate 8 (to the extent present), or the flying scanning devices operating prior to delivery of the parcel P to the scanning window 4.

With reference to FIG. 6, in embodiments the system 1 may further comprise a scanning gate 8 at the scanning window 2. The scanning gate 8 comprises a plurality of further scanning devices C1, C2, C3, C4, C5 (the number of the scanning devices is in principle variable and not limited to the particular arrangement shown in the figures, but a preferred arrangement comprises five scanning devices, one for each exposed surface of a box shaped parcel) configured to scan identifying features ID1, ID2, ID3 at one or more surfaces of the parcel P other than the resting surface R. Each of the scanning devices C1-C5 comprise, similarly to the scanning device 4, a 2D imaging device, such as a 2D camera or a data matrix scanner.

In other terms, the scanning gate 8 is configured to cooperate with the scanning window 2 to provide all-round scanning capabilities to the system 1, regardless of the parcel P involved in the scanning, as all of the faces or surfaces of the parcel P become accessible and readable by the scanning devices C1-C5 and 4 thanks to the scanning window 2.

In embodiments, the system 1 may further comprise a handling robot 10 configured for picking a parcel P from upstream parcel processing stages and releasing the same onto the scanning window 2. The handling robot 10 is preferably provided in combination with the scanning gate 8, whereby the robot 10 can drop a parcel P off at the scanning window 2 in order for the same to have the identifying features thereof scanned all around, but in embodiments the handling robot 10 may be used as a mere transfer system from an upstream scanning gate to the scanning window to complete the scanning of identifying features by scanning the feature ID4.

Regardless of this, the robot 10 may be provided with a picking end effector for picking and handling the parcel P and a cleaning end effector for performing cleaning functions at the scanning window 2. Such end effectors may be interchangeable, or may be provided as a combined end effector that, in addition to picking, also performs cleaning functions at the scanning window 2.

An example of such a cleaning end effector is a cleaning solution sprayer end effector, possibly paired with a wiper device or similar to keep the surfaces of the scanning window 2 as clean as possible to avoid inaccurate readings because of dirt or particles build-up.

Operation of the system 1 is as follows. Parcels P are delivered to and positioned onto the scanning window 2 preferably by means of the handling robot 10. Other positioning systema may be used as an alternative to the handling robot 10, for instance a dropoff conveyor that outputs parcels P from a parcel sorting area.

The parcel P accordingly sits onto the scanning window 2 resting on the surface R and exposing all of the identifying features ID1, ID2, ID3 on the surfaces other than the surface R (again the number and the location is purely exemplary, and it is in no way to be construed as limiting the scope of the invention). Such identifying features can be scanned by the scanning gate 8 directly at the scanning window 2 by scanning devices C1-C5 (again the number and the location in the figure is purely exemplary, and it is in no way to be construed as limiting the scope of the invention), while the identifying feature ID4 on the surface R is scanned by the scanning device 4 arranged on an opposite side of the scanning window 2 than the parcel P. In this sense, according to the invention, the scanning window takes over both the supporting function of the conveyors CV1 and CV2 in respect of the parcel P, and the scanning function provided by the gap G, without—however—taking any of the related drawbacks. The scanning window 2 exposes the hidden surface R by being light permeable, thus making the parcel P all-around exposed and actually allowing for all-around scanning of the identifying features ID1-ID4 at a single station combining the scanning window 2 and the scanning gate 8. This makes for the function of the gap G without calling for use of a linear scan camera LSC: the scanning device may be a 2D scanning device just like the scanning devices C1-C5 and scanning of the identifying features ID1-ID4 may thus take advantage of the same scanning performances. Furthermore, there is no need for merging data processed by different types of scanning devices as it happens with prior art solution based on LSC cameras and 2D scanning devices. Note also that scanning scanning of the exposed faces of the parcel P, i.e. the faces other than the resting surface R, may be performed before delivering the parcel P to the scanning window 2, especially when the scanning gate 8 is not provided for. In such cases, scanning may be performed shortly after leaving the parcel sorting area (e.g. on the dropoff conveyor) or by the handling robot 10 that may be provided with a reading end effector configured for surveying the exposed faces of the parcel P and scanning the identifying features thereon. As with the cleaning end effector, the scanning end effector may be interchangeable with the picking and or the cleaning end effectors, or may be provided as a combined end effector that, in addition to picking and/or cleaning, also performs scanning functions.

As to the taking over the function of conveyors CV1 and CV2, once the scanning is over the scanning window 2 is operated into the transfer position, which in the preferred embodiment herein corresponds to a rotation A2 of the window 2 that encourages the parcel P off the window itself. The parcel P may then slide or tumble (in this sense, the operation of the scanning window 2 from the scanning position to the transfer position may be adjusted based on the type of parcel and handling prescriptions thereof—e.g. for fragile goods) directly onto the conveyor CV3. This also bears witness to another technical advantage of the invention over the prior art which corresponds to the elimination of two conveyors CV1 and CV2 in favor of a single device (the scanning window 2). A bonus combined effect is the elimination of the gap G, and of all of the parcel jamming or parcel falling issues that come with the gap G. An additional bonus effect when the scanning window 2 also features the rejection position is the possibility to handle a wide range of parcel processing events, including rejection of the parcel P. In the latter case, instead of operating the scanning window 2 to the transfer position and transferring the parcel P to the takeaway facility (e.g. the conveyor CV3), the scanning window can be operated to the rejection position to encourage the parcel P off the scanning window itself and on to a rejection path.

Naturally, while the principle of the invention remains the same, the details of construction and the embodiments may widely vary with respect to what has been described and illustrated purely by way of example, without departing from the scope of the present invention.

The invention claimed is:

1. A parcel handling and tracking system for reading identifying features on parcels moving through the handling and tracking system, comprising:
    a scanning window movable from a reading position to a transfer position, the scanning window being configured to support a parcel at a resting surface of the parcel when in the reading position,
    a first scanning device positioned at the scanning window on an opposite side of the parcel when the scanning window is in the reading position, the first scanning device being configured to scan one or more identifying features on the parcel,
    wherein the scanning window is light permeable to allow scanning therethrough of one or more identifying features at the resting surface of the parcel by the first scanning device when the scanning window is in the reading position, and
    wherein the scanning window is configured to be flipped to the transfer position to move the parcel off the scanning window.

2. The parcel handling and tracking system of claim 1, wherein said first scanning device comprises a 2D scanning device.

3. The parcel handling and tracking system of claim 1, wherein the scanning window is rotatable around a first axis from the reading position to the transfer position.

4. The parcel handling and tracking system of claim 3, wherein said first axis is located at or is parallel to an edge of said scanning window, and outside a perimeter of the scanning window.

5. The parcel handling system according to claim 3, wherein the scanning window is also rotatable around a second axis from the reading position to a rejection position to move the parcel off the scanning window and on to a rejection path.

6. The parcel handling and tracking system of claim 1, wherein in the reading position the scanning window lies at a horizontal direction so as to support the parcel thereon, and in the transfer position the scanning window lies at an angle to the horizontal direction to encourage the parcel off the scanning window.

7. The parcel handling and tracking system of claim 6, wherein said angle is between 30° and 110°.

8. The parcel handling and tracking system according to claim 1, further comprising a scanning gate arranged at the scanning window, the scanning gate comprising a plurality of further scanning devices configured to scan one or more identifying features at one or more surfaces of the parcel other than the resting surface.

9. The parcel tracking and handling system of claim 8, wherein the plurality of further scanning devices comprise a plurality of 2D scanning devices.

10. The parcel tracking and handling system of claim 1, further comprising a takeaway facility in the form of an output conveyor, configured to receive the parcel from the scanning window when the scanning window is moved to the transfer position.

11. The parcel tracking and handling system of claim 1, further comprising a handling robot configured for picking the parcel and releasing the parcel onto the scanning window.

12. The parcel tracking and handling system of claim 11, wherein said handling robot comprises a cleaning end effector, the cleaning end effector configured for cleaning the scanning window.

13. The parcel tracking and handling system of claim 1, wherein said scanning window is made of shatter proof glass.

14. A method of scanning identifying features in the parcel tracking and handling system according to claim 1, the method comprising:
    positioning the parcel onto the scanning window so that it rests thereon on the resting surface, the scanning window being in the scanning position,
    scanning one or more identifying features at the resting surface by means of the first scanning device, and
    flipping the scanning window to the transfer position to move the parcel off the scanning window and onto a parcel takeaway facility.

15. The method of claim 14, wherein said positioning a parcel onto the scanning window comprises positioning the parcel by means of a handling robot.

* * * * *

UNITED STATES PATENT AND TRADEMARK OFFICE
CERTIFICATE OF CORRECTION

PATENT NO. : 11,919,725 B2
APPLICATION NO. : 17/981932
DATED : March 5, 2024
INVENTOR(S) : Anselmo Cicchitti Page 1 of 1

It is certified that error appears in the above-identified patent and that said Letters Patent is hereby corrected as shown below:

On the Title Page

Item (71) Applicant address information should be listed as:
- Fameccanica.Data S.p.A., San Giovanni Teatino (Chieti), ITALY -

Item (72) Inventor address information should be listed as:
- Anselmo CICCHITTI, San Giovanni Teatino (Chieti), ITALY -

Signed and Sealed this
Eighteenth Day of March, 2025

Coke Morgan Stewart
*Acting Director of the United States Patent and Trademark Office*